US007822992B2

(12) United States Patent  
Rogerson et al.

(10) Patent No.: US 7,822,992 B2
(45) Date of Patent: Oct. 26, 2010

(54) IN-PLACE CONTENT SUBSTITUTION VIA CODE-INVOKING LINK (75) Inventors: Dale E. Rogerson, Seattle, WA (US); Sridhar Chandrashekar, Redmond, WA (US); J. Shane McRoberts, Seattle, WA (US); Wenlong Dong, Redmond, WA (US); Andrew D. Reddish, Seattle, WA (US); Praful Chavda, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 825 days.

(21) Appl. No.: 10/819,607

(22) Filed: Apr. 7, 2004

(65) Prior Publication Data

US 2005/0229252 A1   Oct. 13, 2005

(51) Int. Cl.
G06F 11/00 (2006.01)
G06F 12/14 (2006.01)
G06F 12/16 (2006.01)
G06F 7/04 (2006.01)
G06F 17/30 (2006.01)
G06F 11/30 (2006.01)
G08B 23/00 (2006.01)
H04N 7/16 (2006.01)
B41K 3/38 (2006.01)

(52) U.S. Cl. .......................... 713/187; 726/22; 726/26; 380/59

(58) Field of Classification Search ................ 713/187, 713/168, 176; 726/22, 26, 27, 30; 380/59
See application file for complete search history.

(56) References Cited

U.S. PATENT DOCUMENTS

| 5,263,167 | A |   | 11/1993 | Conner, Jr. et al. |
| 5,319,580 | A | * | 6/1994  | Sakata et al. ................. 702/185 |
| 5,602,990 | A | * | 2/1997  | Leete ........................... 714/46 |
| 5,701,469 | A |   | 12/1997 | Brandli et al. |
| 5,715,468 | A |   | 2/1998  | Budzinski |
| 5,819,089 | A |   | 10/1998 | White |
| 5,850,446 | A | * | 12/1998 | Berger et al. .................. 705/79 |
| 5,911,776 | A | * | 6/1999  | Guck ........................... 709/217 |
| 6,038,598 | A | * | 3/2000  | Danneels ....................... 709/219 |
| 6,041,287 | A | * | 3/2000  | Dister et al. ................. 702/182 |
| 6,189,002 | B1 |   | 2/2001  | Roitblat |
| 6,249,784 | B1 |   | 6/2001  | Macke et al. |
| 6,253,326 | B1 | * | 6/2001  | Lincke et al. ................. 726/12 |
| 6,260,035 | B1 |   | 7/2001  | Horvitz et al. |

(Continued)

OTHER PUBLICATIONS

"Extensible Stylesheet Language (XSL)", W3C Working Draft Apr. 21, 1999.*

(Continued)

*Primary Examiner*—Nasser Moazzami
*Assistant Examiner*—Oscar A Louie
(74) *Attorney, Agent, or Firm*—Woodcock Washburn LLP (57) ABSTRACT Content including links to behaviors (code which can be executed and return supplemental content for insertion, or can modify existing content) is stored, and at run-time, the links to behaviors are followed and the supplemental content or the modifications to existing comment are used to create a final version of content which will be presented to the user. Security enhancements including a security check ensure that only behaviors which are secure will be run. Default content may be provided, which may be inserted if the security check is not passed, or if the content returned from the behavior is unusable for some reason.

19 Claims, 5 Drawing Sheets

U.S. PATENT DOCUMENTS

| | | | |
|---|---|---|---|
| 6,260,037 B1 | 7/2001 | Bestgen et al. | |
| 6,262,730 B1 | 7/2001 | Horvitz et al. | |
| 6,263,440 B1* | 7/2001 | Pruett et al. | 726/35 |
| 6,327,590 B1 | 12/2001 | Chidlovski et al. | |
| 6,456,234 B1 | 9/2002 | Johnson | |
| 6,473,800 B1* | 10/2002 | Jerger et al. | 709/226 |
| 6,487,553 B1 | 11/2002 | Emens et al. | |
| 6,493,702 B1 | 12/2002 | Adar et al. | |
| 6,519,592 B1 | 2/2003 | Getchius et al. | |
| 6,529,909 B1 | 3/2003 | Bowman-Amuah | |
| 6,535,896 B2* | 3/2003 | Britton et al. | 715/239 |
| 6,539,396 B1 | 3/2003 | Bowman-Amuah | |
| 6,557,008 B1 | 4/2003 | Temple et al. | |
| 6,562,076 B2* | 5/2003 | Edwards et al. | 715/229 |
| 6,585,778 B1* | 7/2003 | Hind et al. | 715/235 |
| 6,633,867 B1 | 10/2003 | Kraft et al. | |
| 6,650,998 B1 | 11/2003 | Rutledge et al. | |
| 6,658,625 B1* | 12/2003 | Allen | 715/236 |
| 6,691,106 B1 | 2/2004 | Sathyanarayan | |
| 6,788,313 B1 | 9/2004 | Heil | |
| 6,795,868 B1 | 9/2004 | Dingman et al. | |
| 6,810,395 B1 | 10/2004 | Bharat | |
| 6,820,135 B1 | 11/2004 | Dingman et al. | |
| 6,857,102 B1* | 2/2005 | Bickmore et al. | 715/205 |
| 6,892,196 B1 | 5/2005 | Hughes | |
| 6,906,719 B2 | 6/2005 | Chadha et al. | |
| 6,968,332 B1 | 11/2005 | Milic-Frayling et al. | |
| 6,968,333 B2 | 11/2005 | Abbott et al. | |
| 6,976,017 B1 | 12/2005 | Getchius | |
| 6,990,629 B1 | 1/2006 | Heaney et al. | |
| 6,996,776 B1* | 2/2006 | Makely et al. | 715/207 |
| 6,996,781 B1 | 2/2006 | Myers et al. | |
| 7,039,861 B2* | 5/2006 | Yagi | 715/251 |
| 7,047,498 B2* | 5/2006 | Lui et al. | 715/762 |
| 7,096,424 B2 | 8/2006 | Graham et al. | |
| 7,120,622 B2* | 10/2006 | Zellweger et al. | 707/1 |
| 7,162,697 B2* | 1/2007 | Markel | 715/717 |
| 7,174,370 B1 | 2/2007 | Saini et al. | |
| 7,177,403 B2 | 2/2007 | Meyerson et al. | |
| 7,185,274 B1* | 2/2007 | Rubin et al. | 715/205 |
| 7,263,522 B2 | 8/2007 | Tremblay | |
| 7,305,380 B1 | 12/2007 | Hoelzle et al. | |
| 7,472,349 B1 | 12/2008 | Srivastava et al. | |
| 7,506,257 B1 | 3/2009 | Chavez et al. | |
| 7,519,578 B2 | 4/2009 | Mihai et al. | |
| 7,523,095 B2 | 4/2009 | Gates et al. | |
| 7,716,158 B2 | 5/2010 | McConnell | |
| 2002/0015056 A1 | 2/2002 | Weinlaender | |
| 2002/0073057 A1 | 6/2002 | Benoit et al. | |
| 2002/0087535 A1 | 7/2002 | Kotcheff et al. | |
| 2002/0118220 A1* | 8/2002 | Lui et al. | 345/709 |
| 2002/0138479 A1 | 9/2002 | Bates et al. | |
| 2002/0169856 A1 | 11/2002 | Plow et al. | |
| 2002/0184401 A1 | 12/2002 | Kadel et al. | |
| 2002/0194166 A1 | 12/2002 | Fowler | |
| 2003/0037076 A1 | 2/2003 | Bravery et al. | |
| 2003/0059001 A1* | 3/2003 | Meyerson et al. | 379/88.13 |
| 2003/0144911 A1 | 7/2003 | Lin-Hendel | |
| 2003/0217052 A1 | 11/2003 | Rubenczyk et al. | |
| 2003/0220908 A1 | 11/2003 | Chou | |
| 2003/0229900 A1 | 12/2003 | Reisman | |
| 2004/0083431 A1 | 4/2004 | Graham et al. | |
| 2004/0107193 A1 | 6/2004 | Tremblay | |
| 2004/0194141 A1 | 9/2004 | Sanders | |
| 2005/0050000 A1 | 3/2005 | Kwok et al. | |
| 2005/0065773 A1 | 3/2005 | Huang et al. | |
| 2005/0097188 A1 | 5/2005 | Fish | |
| 2005/0114757 A1 | 5/2005 | Sahota et al. | |
| 2005/0131920 A1 | 6/2005 | Rust et al. | |
| 2005/0228781 A1 | 10/2005 | Chandrashekar et al. | |
| 2005/0229099 A1 | 10/2005 | Rogerson et al. | |
| 2008/0140705 A1 | 6/2008 | Luo | |

OTHER PUBLICATIONS

"XSL Transformations (XSLT)", Version 1.0, W3C Working Draft Jul. 9, 1999.*

"Extensible Markup Language (XML)", W3C Recommendation Feb. 10, 1998.*

"Designing and implementation of an access control processor for XML documents," Damiani et al., Elsevier Science B.V., Computer Networks 33 (2000) 59-75, Published 2000.*

"Securing XML Documents with Author-X," Bertino et al., IEEE Internet Computing vol. 5 No. 3, May-Jun. 2001.*

"XML based Security for E-Commerce Applications," Xavier et al., IEEE 2001.*

"XML and security," Selkirk, BT Technology Journal, vol. 19 No. 3, Springer, Jul. 2001.*

Burrell, J. et al., "Context-Aware Computing: A Test Case", *UbiComp: ubiquitous Computing, 4th international Conference, Proceedings(Lecture Note in Computer Science)*, 2002, 2498, 1-15.

Canos, J.H. et al., "Building Safety Systems with Dynamic Disseminations of Multimedia Digital Objects", *D-Lib Magazine*, 2003, 9(1).

De Sutter, R. et al., "Dynamic Adaptation of Multimedia Data for Mobile Applications", *Proceedings of the SPIE—The International Society for Optical Engineering*, 2002, 4862, 240-248.

Finkelstein, L. et al., "Placing Search in Context: The Concept Revisited", *Proceedings of the 10th International Conference on World Wide Web*, 2001, 406-414.

Granmo, O.C. et al., "Dynamic Object-Oriented Bayesian Networks for Flexible Resource-Aware Content-Based Indexing of Media Streams", *Proceedings of 12th Scandinavian Conference on Image Analysis*, 2001, 587-594.

Lemlouma, T. et al., "Context-Aware Adaptation for Mobile Devices", *Proceedings 2004 IEEE International Conference on Mobile Data Management*, 2004, 106-111.

Lum, W.Y. et al., "A QoS-Sensitive Content Adaptation System for Mobile Computing", *Proceedings 26th Annual International Computer Software and Applications*, 2002, 680-685.

Ozturk, P., "Towards a Knowledge-Level Model of Context and Context use in Diagnostic Problems", *Applied Intelligence: The International Journal of Artificial intelligence, Neural Networks, and Complex Problem-Solving Technologies*, 1999, 10(2-3), 123-127.

Tsuji, S. et al., "A Framework to Provide Integrated Online Documentation", *ACM Special Interest Group for Design of Communications, Proceedings of the 19th Annual International Conference on Computer Documentation*, 2001, 185-192.

In the United States Patent and Trademark Office, Non-Final Office Action in re:. U.S. Appl. No. 10/819,661, filed Apr. 7, 2004, Dated Aug. 8, 2006, 23 pages.

In the United States Patent and Trademark Office, Final Office Action in re:. U.S. Appl. No. 10/819,661, filed Apr. 7, 2004, Dated Jan. 23, 2007, 11 pages.

In the United States Patent and Trademark Office, Non-Final Office Action in re:. U.S. Appl. No. 10/819,661, filed May 29, 2007, Dated Apr. 7, 2004, 11 pages.

In the United States Patent and Trademark Office, Non-Final Office Action in re:. U.S. Appl. No. 10/819,661, filed Apr. 7, 2004, Dated Nov. 8, 2007, 11 pages.

In the United States Patent and Trademark Office, Final Office Action in re:. U.S. Appl. No. 10/819,661, filed Apr. 7, 2004, Dated Jun. 17, 2008, 12 pages.

In the United States Patent and Trademark Office, Non-Final Office Action in re:. U.S. Appl. No. 10/819,661, filed Apr. 7, 2004, Dated Jan. 2, 2009, 13 pages.

W3C, "XSL Transformations (XSLT) Version 1.0", Nov. 16, 1999, http://www.w3.org/TR/1999/REC-xslt-19991116.

W3C, "XML Schema Requirements", Feb. 15, 1999, http://www.w3.org/TR/1999/NOTE-xml-schema-req-19990215.

Rutledge, et al., "Hypermedia Semantics: Finding the Story: Broader Applicability of Semantics and Discourse for Hypermedia Generation", Proceedings of the Fourteenth ACM Conference on Hypertext and Hypermedia, ACM Press, Aug. 2003, 67-76.

In the United States Patent and Trademark Office, Non-Final Office Action in re:. U.S. Appl. No. 10/819,606, filed Apr. 7, 2004, Dated May 4, 2007, 16 pages.

In the United States Patent and Trademark Office, Non-Final Office Action in re:. U.S. Appl. No. 10/819,606, filed Apr. 7, 2004, Dated Oct. 10, 2007, 18 pages.

In the United States Patent and Trademark Office, Final Office Action in re:. U.S. Appl. No. 10/819,606, filed Apr. 7, 2004, Dated Apr. 9, 2008, 22 pages.

In the United States Patent and Trademark Office, Non-Final Office Action in re:. U.S. Appl. No. 10/819,606, filed Apr. 7, 2004, Dated Apr. 27, 2009, 16 pages.

In the United States Patent and Trademark Office, Non-Final Office Action in re:. U.S. Appl. No. 10/754,984, filed Jan. 9, 2004, Dated Aug. 31, 2006, 10 pages.

In the United States Patent and Trademark Office, Final Office Action in re:. U.S. Appl. No. 10/754,984, filed Jan. 9, 2004, Dated Feb. 22, 2007, 12 pages.

In the United States Patent and Trademark Office, Non-Final Office Action in re:. U.S. Appl. No. 10/754,984, filed Jan. 9, 2004, Dated Sep. 10, 2007 12 pages.

In the United States Patent and Trademark Office, Non-Final Office Action in re:. U.S. Appl. No. 10/754,984, filed Jan. 9, 2004, Dated Oct. 28, 2008, 10 pages.

In the United States Patent and Trademark Office, Final Office Action in re:. U.S. Appl. No. 10/754,984, filed Jan. 9, 2004, Dated Apr. 29, 2009, 14 pages.

Finkelstein, L. et al., "Placing Search in Context: The Concept Revisited", Proceedings of the $10^{th}$ International Conference on World Wide Web, 2001, 406-414.

Tsuji, S. et al., "A Framework to Provide Integrated Online Documentation", ACM Special Interest Group for Design of Communications, Proceedings of the $19^{th}$ Annual International Conference on Computer Documentation, 2001, 185-192.

U.S. Appl. No. 10/754,984: Final Rejection, Mar. 17, 2008, 23 pages.

U.S. Appl. No. 10/754,984: Notice of Allowance, Oct. 26, 2009, 20 pages.

U.S. Appl. No. 10/819,606: Final Rejection, Nov. 24, 2009, 28 pages.

U.S. Appl. No. 10/819,606: Non-Final Rejection, Jul. 2, 2010, 33 pages.

U.S. Appl. No. 10/819,661: Final Rejection, Oct. 8, 2009, 12 pages.

* cited by examiner

IN-PLACE CONTENT SUBSTITUTION VIA CODE-INVOKING LINK

CROSS-REFERENCE TO RELATED APPLICATIONS

The subject matter described herein is related to the subject matter disclosed in granted U.S. Pat. No. 7,716,158 filed on Jan. 9, 2004 entitled "System and Method for Context Sensitive Searching;" to U.S. patent application Ser. No. 10/819,606 entitled "Activating Content Based on State" filed on the same date as the present application; and to U.S. patent application Ser. No. 10/819,661, entitled "Presentation-Independent Semantic Authoring of Content" filed on the same date as the present application.

FIELD OF THE INVENTION

This invention relates in general to the field of information technology. More particularly, this invention relates to a computing environment context to facilitate the display of content by allowing runtime invocation of code included in content.

BACKGROUND OF THE INVENTION

In many contexts in computer systems, information is stored and later presented to a user. In one such context, help systems for software applications, help information is stored and presented to a user. In such a help system, for example, a user may inquirer as to how to change a specific setting for a printer attached to an application. In response, the application's associated help system may provide the user with help information regarding changing the setting.

However, in prior art help contexts and in other information presentation contexts, the information stored and presented to the user is generally static information. Each time a specific help topic is displayed to the user, it contains the same actual content presented in the same way. This is a drawback for several reasons.

First, to use this help content, the user may need to have knowledge about and understand details about the setup and current functioning of the user's computer system. For example, the help content may ask how the printer is attached (e.g. local or networked), what version of some software application is running on the user's computer, or other details dependent on the setup and functioning of the user's computer, and may guide the user based on the answers to these questions. Providing help information in the alternative based on some detail of the user's computer system may be done by including all the information in the help content (e.g. "if the printer is a networked printer" will be followed by directions on changing the setting for a networked printer, but the same help screen may include "if the printer is a local printer" and directions on changing the setting for a local printer.) Providing help information in the alternative may also be accomplished by requesting that the user make a selection (e.g. "is the printer a networked or local printer?") and then presenting the applicable help information to the user.

As another example, if a user is a novice user, a help topic may need to include very detailed help information on performing a certain change. However, if the user is an expert user, the same help topic may need to include only one sentence. As detailed above, in the prior art the flexibility which is required to present different information to the different types of users in this situation is limited and cumbersome to the user.

In either instance, the user in such a situation is required to have some sophistication in knowing the setup of their computer system and the current state of the computer system. This requirement produces some confusion and dissatisfaction with less sophisticated users and requires additional time for even sophisticated users who are consulting the help system.

In addition, there may be a need for content to be authored at one time, and for content to be adapted at a later time. For example, a mistake may be corrected, new information added, or new UI functionality incorporated. In order to make even minor adaptations, entire files or groups of files of content must be replaced. This replacement is resource intensive. For example, if help code relates to the name of a product, or to a help website or phone number, and that name, website, or phone number are changed, the replacement of the information with current information must occur at each point in which the outdated information appears.

In the prior art described above, content is limited to the static content which appears in the content files. There is no mechanism by which some content not appearing in the content files can be presented to the user.

While some earlier help systems did allow script to be included in the help content, code and content were not separated, which was led to inflexibility and insecurity in the provision of help content.

Thus, there is a need for a system and method to overcome these deficits in the prior art. The present invention addresses the aforementioned needs and solves them with additional advantages as expressed herein.

SUMMARY OF THE INVENTION

Dynamic flexible content is enabled by allowing content to be tailored at runtime instead of when it is authored. In order to allow content to be adapted the content contains at least one link to code (the code is also known as a "behavior") which can be executed to modify or add content. This in-placed substitution is done at a transformation time, when the content is transformed from a format in which authoring is accomplished (for example, extensible markup language (XML)) to a presentation format, such as HTML (hypertext markup language) format or RTF (rich text format).

A generalized linking mechanism is used to link to and invoke behaviors in the content during the transformation of the content from the authoring format to the presentation format.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

A method of providing dynamic content to a user allows for dynamic flexible content that can be tailored at runtime instead of at authoring time. In one embodiment, an extensible markup language (XML) is used to author content. The content includes links. At runtime, when the content is to be displayed, the links are evaluated. If a link is found which links to a behavior tag is found, the tag is parsed and causes code to be executed.

A help system will be used in this specification to describe the invention, however, the invention is not limited to use in help systems, but rather can be more widely used, for example, in other systems where content is authored so that the presentation is dynamic and finalized at runtime instead of authoring time.

Exemplary Computing Environment

Figure 1:
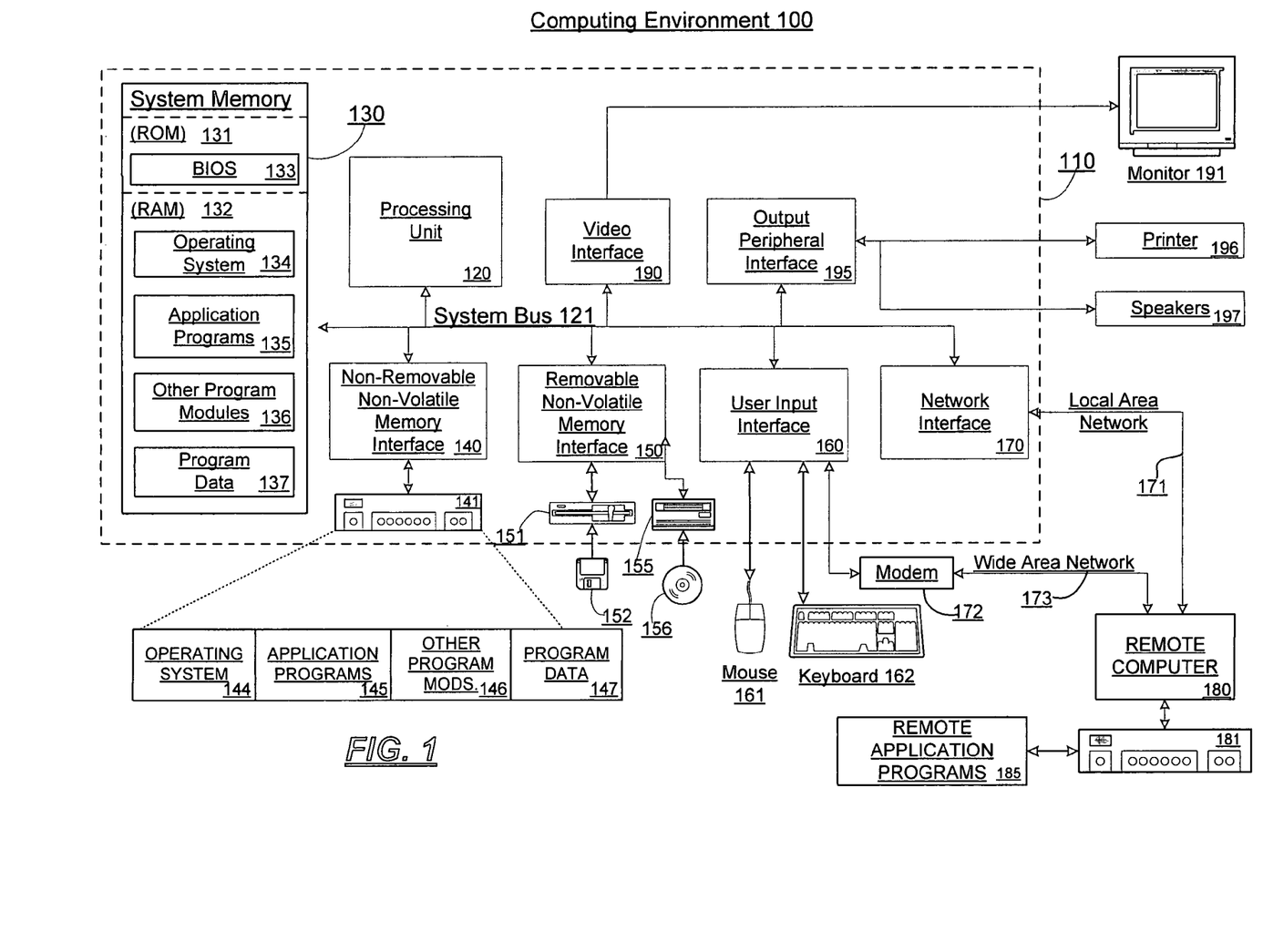
FIG. 1 is a block diagram of an exemplary computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Content Transformation Engine

Figure 2:
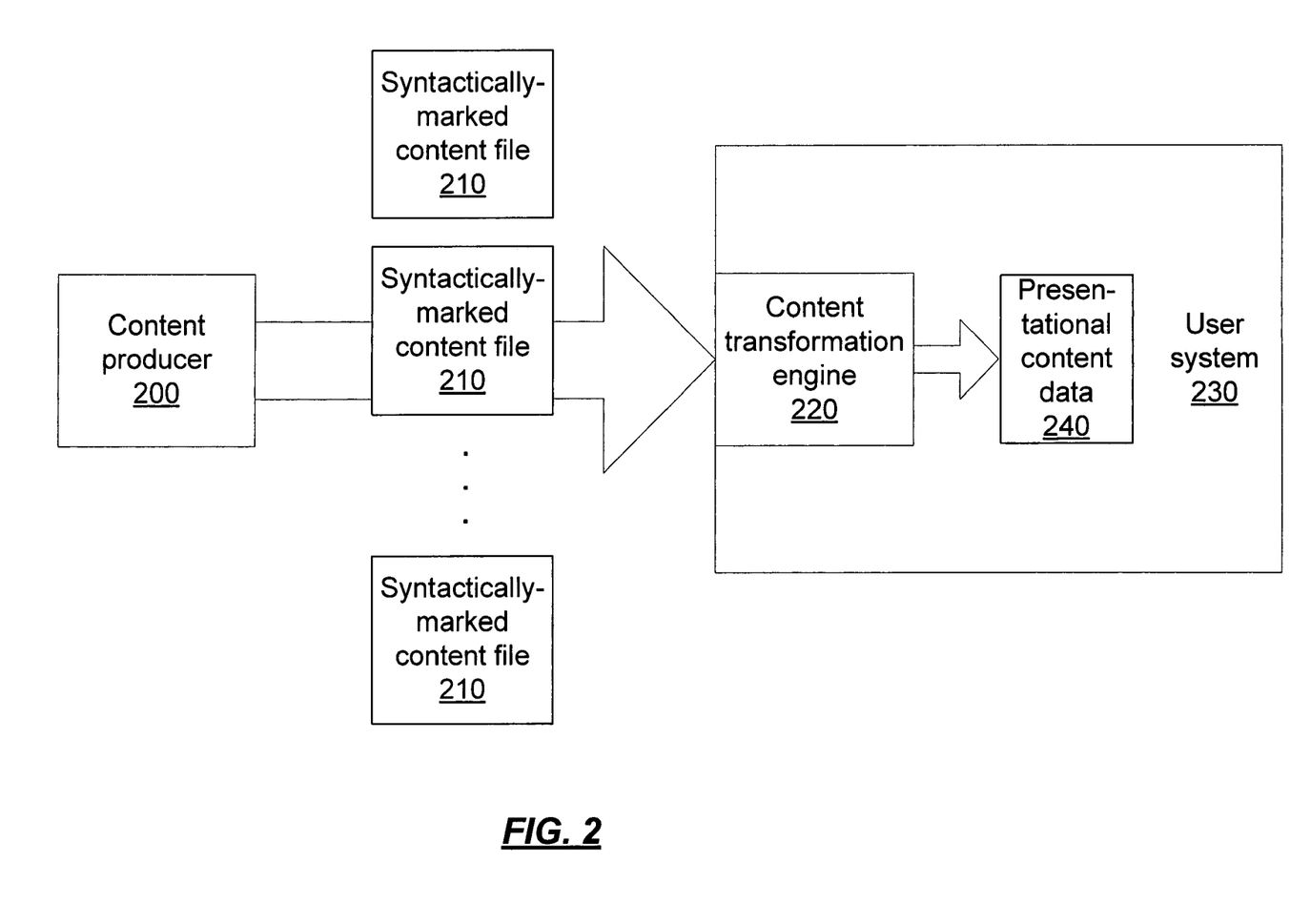
FIG. 2 is a block diagram of the content transformation engine on a user's computer system according to one embodiment of the invention.

In one embodiment, content is translated from a semantic description of the content to a presentational version. This translation occurs in a content transformation engine. FIG. 2 shows one example of the content transformation engine on a user's computer system. A content producer 200 provides one or more pre-transformation content files 210. These files may come from one content producer, or from a number of content producers. A content transformation engine 220 on the user system 230 transforms these into presentation content data 240. In one embodiment, the transformation occurs only when the pre-transformation content files 210 are needed for presentation to the user. In one such embodiment, pre-transformation content files 210 are stored on the user system 230. In another such embodiment, some or all of pre-transformation content files may be accessed by the user system 230 only when a request for content is made which requires a content transformation. In yet another embodiment, the transformation occurs during an initial setup period. For example, help files may be initialized when a help system is deployed on the user system 230.

Figure 3:
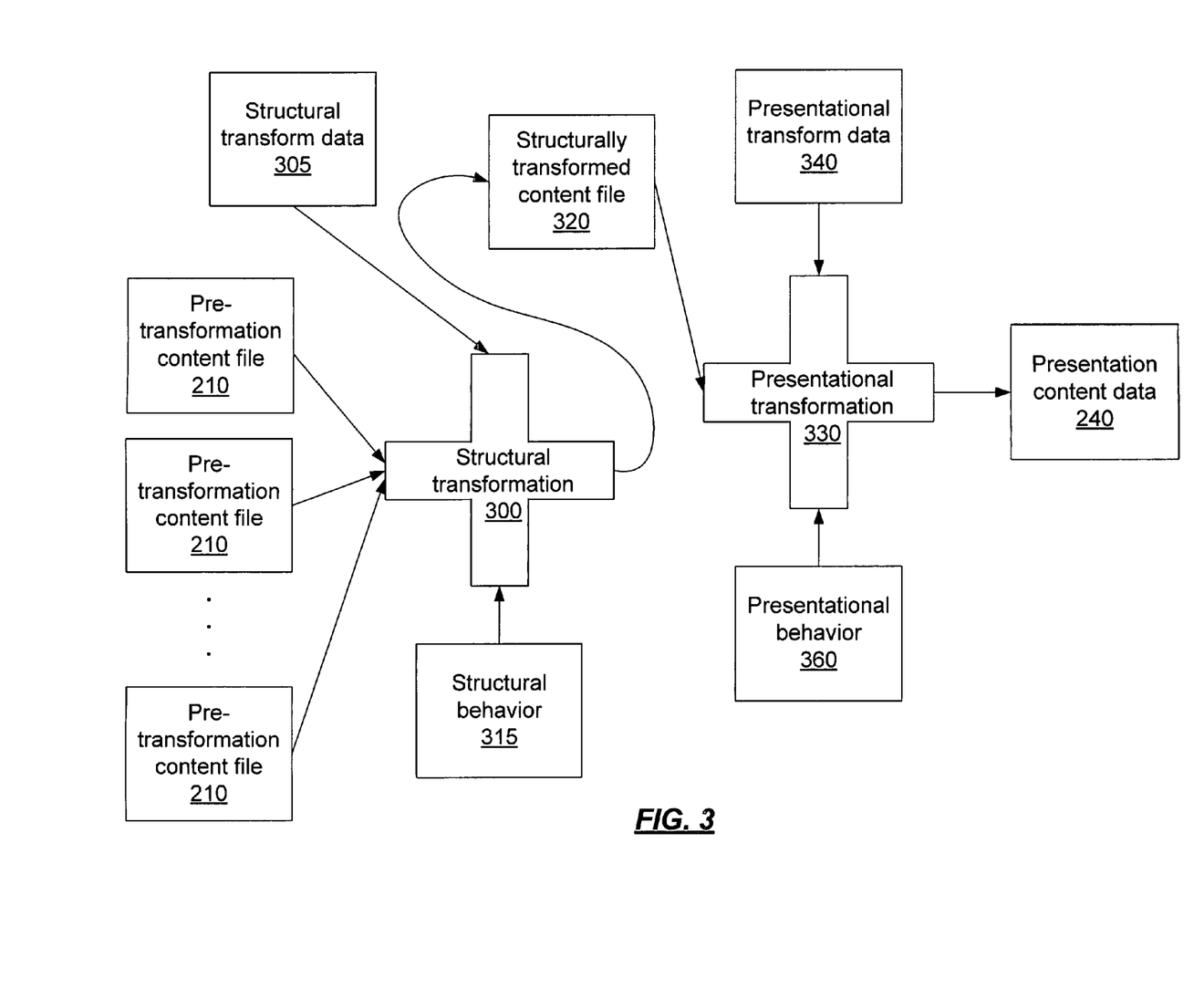
FIG. 3 illustrates the operation of the content transformation engine according to one embodiment of the invention.

FIG. 3 illustrates the operation of the content transformation engine according to one embodiment of the invention. As shown in FIG. 3, in order to provide state-dependent information, according to one embodiment, a number of pre-transformation content files 210 are used together, along with structural transform data 305 as inputs to a structural transform 300. These pre-transformation content files 210 contain content. A number of pre-transformation content files 210 may be combined in order to provide content for a display to the user. For example, in the context of a help system, it may be helpful to have a fragment of a help topic displayed along with one other fragment in one help topic, and with other fragments in a different help topic. If a number of help topics will direct a user to a control panel, for example, only one fragment needs to describe the access for that control panel, and then other fragments can describe different actions to take once the control panel is accessed. In order to execute such a combination of fragments of content for a single display, as shown in FIG. 3, the pre-transformation content file 210 for each of the help fragments is an input to a structural transformation 300. Any number of structural transformations 300 may be performed (including none). The result of any structural transformations is a complete structurally-transformed content file 320.

An additional input to the structural transformation 300 is structural behavior 315. The structural behavior 315 provides state information and behavior information for the structural transform 300. This state information is information about the computing environment where the content transformation engine 220 resides. This state information is used for evaluating any conditional statements that are to be evaluated during the structural transformation stage. The behavior information is invoked, as described below, when behavior links are present in the content and evaluated at the structural transformation stage.

The state information may be provided by one or more monitors which monitor a system to provide context information. Each monitor tracks information about a particular state including whether it is currently true or false. Examples of states which may be useful in determining the context of a search include hardware, software, and user preferences and controls. Hardware states may include the type, model, make, and status of hardware attached to the user computing device. Internet connection state, the local network and the presence of a shared printer, multiple displays, and the type of network are also examples of states in a computing environment. Examples of software states may be the version of operating system used or the application being run and the mode of the application such as editing a document or creating an equation for calculation in a spreadsheet. Examples of user related states include user preferences and conditions such as whether the user is a system administrator, whether the user has selected specific styles or modes in the generation or viewing of documents. Additional states representative of the computing environment may be monitored as new content is downloaded or new applications are installed. The gathering of such state information is detailed in co-pending, co-assigned U.S. patent application Ser. No. 10/754,984. The use of such state information is detailed in co-pending, co-assigned U.S. patent application Ser. No. 10/815,141, filed on the same date as the present application.

Another input to the structural transformation 300 is structural transform data 305. The structural transform data 305 includes data describing how the structural transformation should be accomplished. For example, where the pre-transformation content files 210 are in XML (extensible markup language), the format for the structural transform data 305 may be XSLT (extensible stylesheet language transform) which defines how a transformation should be applied to the XML-formatted pre-transformation content files 210.

A presentational transform 330 is then applied to the resulting structurally-transformed content file 320. Again, inputs to this include transform data (presentational transform data 340) and behavior information (presentational behavior 360). The final result of this presentation transform 330 is presentation content data 240. This presentation content data 240 is presentation data in a format which can be used on the user's computer system. For example, where the user's computer system has the ability to display data in HTML (hypertext markup language) format, the presentation content data may be in HTML format.

In-Place Content Substitution

The pre-transformation content files 210 may contain links to behavior tags. In one embodiment, pre-transformation content files are in an extensible markup language (XML) format which allows for the insertion of links. A specific link is defined, a behavior link. Such link is denoted by a behavior link tag. The target of these links can point to behaviors, code which can be executed and return supplemental content for insertion, or can modify existing content. At runtime, e.g. when the content transformation engine 220 transforms the content files 210 into presentation content data 240, each behavior link tag is followed to find the corresponding behavior. That behavior is parsed and, in certain situations, causes code to be executed. A link may also point to static content (not a behavior link) and in such a case, the static content is inserted into final content.

As seen in FIG. 3, two transformations occur in the content transformation engine 220. In one embodiment, the parsing of the content for behavior links and the resolution of these behavior links are performed in the structural transform 300.

Figure 4:
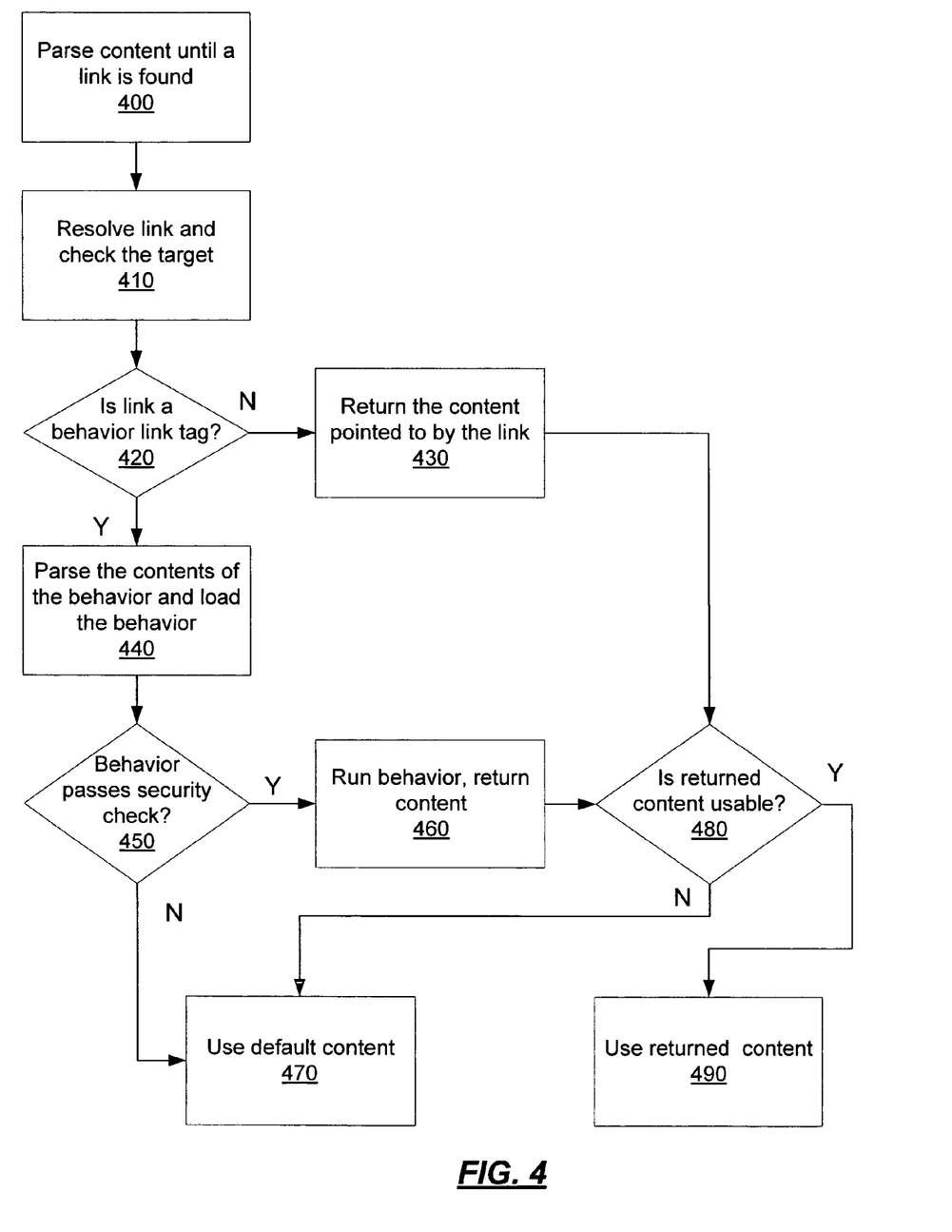
FIG. 4 is a flow diagram of the parsing of content including a behavior link tag according to one embodiment.

FIG. 4 is a flow diagram of the parsing of content including a behavior link tag according to one embodiment. In one embodiment, the content is stored in XML format. In step 400, the content is parsed until a link is found. The link is then resolved in step 410. Resolving the link allows the target of the link to be checked. The target of the link may be additional content data. Where the original content is stored in XML format, the additional content data may be, for example, additional XML-formatted content. The link may also be a behavior link tag, in which case there is a corresponding behavior to be executed. If the link is not a behavior link tag (decision 420), the link points to additional content data, the data is retrieved, step 430.

If the link is a behavior link tag, the contents of the linked-to behavior are parsed, and the behavior is loaded, step 440. The behavior consists of executable code. For example, the behavior may be a .NET assembly. This executable code can return back content or modify the existing content. The executable code can do this by performing actions other than adding or selecting from the static content contained in the content or in the behavior. For example, the code can query the name the user has given to a peripheral device, or what the user's desktop currently looks like. This may be the content returned back from the behavior. Thus, a help topic can provide an accurate description of the peripheral to be used within a help topic, or can provide a graphic showing what the user's current desktop looks like, pointing at a relevant part of the user's desktop in order to provide guidance to the user.

After the behavior is loaded, a security check is then performed, to determine whether the behavior should be run, step 450. If it should be run, the behavior is run, step 460. If not, then the behavior is not run. The security check may determine that the behavior is a trusted behavior, and will not cause problems during execution or produce bogus data.

A link tag, in addition to specifying a link to a behavior, may also provide default content. Where the behavior is not run, this default content (if any was specified) is used, step 470. When the behavior is run, content results. This resulting content (returned content or default content with modifications made by the behavior) is examined. If the resulting content is useable, decision 480, the resulting content is used, step 490. If not, the default text is used, step 470.

With respect to decision 480, several reasons may make the resulting content of a behavior unusable. Resulting content may not be usable because, for example, it does not parse correctly, or if the code constituting the behavior does not execute correctly or exits with an error condition. Content resulting by a link which is not a behavior, from step 430, is also checked in step 480 to determine whether that content should be used, or whether default content (if any was specified) should be used instead.

The returned content or default content may include further behavior links. Additionally, more than one link may be present in the content. Thus, the process shown in FIG. 4 is repeated recursively until no further links are found in the document.

Authoring Content

Figure 5:
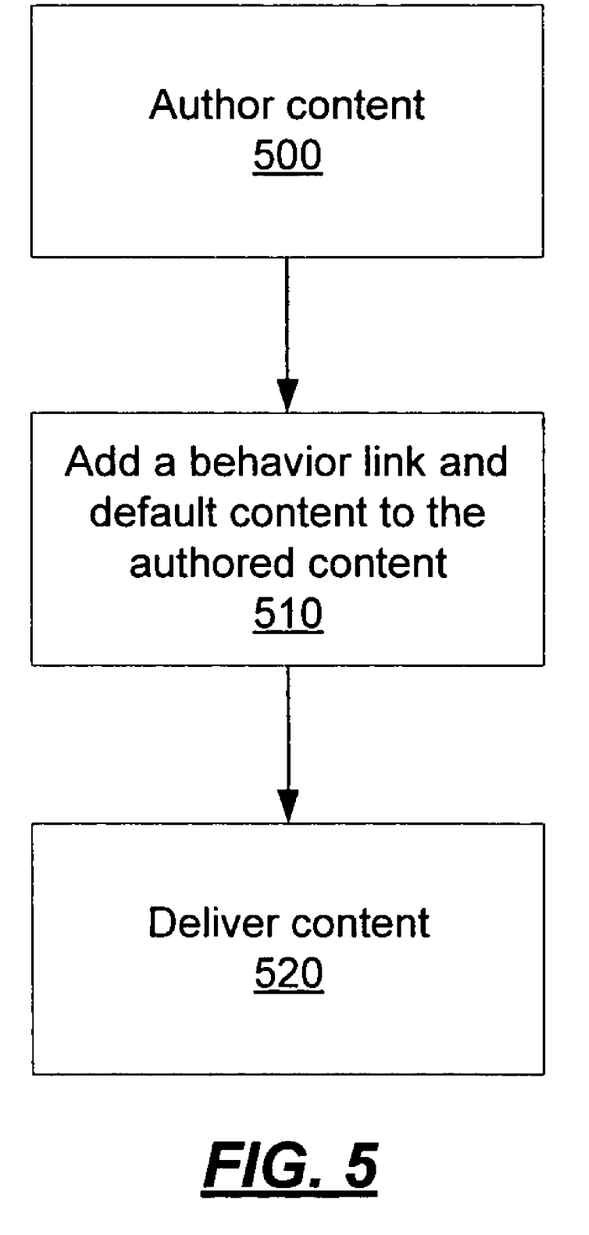
FIG. 5 is a flow diagram of a method for producing content for display according to one embodiment of the invention

In order to author content, initially, content is authored and at least one behavior is placed into the content along with some default content for that behavior. FIG. 5 is a flow diagram of a method for producing content for display according to one embodiment of the invention. As shown in FIG. 5, step 500, content is authored. In step 510, a behavior link and default content are added to the content. In step 520, the content is delivered.

In order to update content that has already been authored and in which a behavior is already included, an author includes a link to behavior code which modifies or supplants default content in the original content. This behavior code is invoked during a transformation, when the link is encountered. Thus, when the user transforms the content into presentation data, the behavior code will be run, and the new effect of the behavior will be seen.

CONCLUSION

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A computer-implemented method of providing in-place content substitution in a computer system, the method comprising:
   parsing, via the computer system, a pre-transformed authored content that has been authored using a first coding format, the authored content containing an embedded behavior link tag linked to a behavior;
   loading said behavior upon encountering said behavior link tag in the authored content;
   performing, via the computer, a security check to determine if said behavior can be trusted to execute correctly;
   if said behavior can be trusted, executing said behavior for querying a current state of the computer system on which the behavior is executed, wherein:
      said querying comprises querying the current state of a desktop of the computer system;
      executing said behavior results in providing a help operation that is specifically tailored to the current state of the desktop; and
      the help operation comprises using the current state of the desktop to point to a portion of the desktop as a guide;
   based on the current state of the computer system, transforming the pre-transformed authored content into a presentation content having a second coding format that is different than the first coding format; and
   if said behavior cannot be trusted, inhibiting execution of said behavior, and transforming thereon, the pre-transformed authored content into a default content having the second coding format.

2. The method of claim 1, wherein determining if said behavior can be trusted to execute correctly, comprises determining if execution will result in bogus data being created.

3. The method of claim 1, further comprising:
   if after transforming the pre-authored content into said presentation content, it is determined that said presentation content does not constitute a usable result, using the default content in place of said presentation content.

4. The method of claim 1, where said querying comprises consulting a state monitor.

5. The method of claim 1, where said current state comprises at least one of: a current state of a peripheral device of the computer system, a current state of software present in the computer system, a current user preference, or current controls set in said computer system.

6. The method of claim 1, wherein said second coding format is a rich text format (RTF).

7. The method of claim 1, wherein transforming the authored content into the presentation content comprises preventing at least a portion of the presentation content from being displayed to a user.

8. The method of claim 7, wherein the at least a portion of the presentation content is permitted to be displayed upon request by the user.

9. The method of claim 1, wherein the help operation comprises using the current state of the desktop to provide a graphical representation of the desktop as an aid.

10. A computer-implemented method of producing a runtime content, the method comprising:
    embedding, via a computer, in a pre-transformed authored content, at least one of a link for fetching additional content data and a behavior link tag for executing a behavior;
    loading said behavior upon encountering said behavior link tag in the pre-transformed authored content;
    performing, via the computer, a security check to determine if said behavior can be trusted to execute correctly;
    querying a current state of a computer system on which the behavior is executed, wherein:
       said querying comprises querying the current state of a desktop of the computer system;
       executing said behavior results in providing a help operation that is specifically tailored to the current state of the desktop; and
       the help operation comprises using the current state of the desktop to provide a graphical representation of the desktop as an aid; and
    generating the runtime content in the computer system by parsing the pre-transformed authored content based on the current state of the computer system, the parsing comprising at least one of using the link for adding additional content data to the authored content and using the behavior link tag for executing the behavior.

11. A user system incorporating a tangible computer readable storage medium having stored thereon a plurality of computer-executable instructions configured to provide in-place content substitution comprising:
    parsing a pre-transformed authored content containing at least one of a) an embedded link for adding additional content data to the authored content and b) an embedded behavior link tag for executing a behavior for influencing said authored content;
    loading said behavior upon encountering said behavior link tag in the pre-transformed authored content;
    performing a security check to determine if said behavior can be trusted to execute correctly, the security check comprising a verification that said behavior will execute as expected and verifying that executing said behavior does not result in production of bogus data;
    if said behavior can be trusted, querying a current state of the user system on which the behavior is executed, wherein:
       said querying comprises querying the current state of a desktop of the user system;
       executing said behavior results in providing a help operation that is specifically tailored to the current state of the desktop; and
       the help operation comprises using the current state of the desktop to point to a portion of the desktop as a guide; and
    generating a presentation content by parsing the authored content in accordance with the current state of the user system.

12. The system of claim 11, wherein the authored content contains a link and does not contain a behavior link tag.

13. The system of claim 11, wherein the authored content contains a behavior link tag and does not contain a link.

14. The system of claim 11, further comprising:
    determining if the result of executing said behavior produces a usable result; and if executing said behavior produces a usable result, including said usable result in said presentation content, and, if executing said behavior does not produce a usable result, including a default content in said presentation content.

15. The system of claim 11, where said current state comprises at least one of: a) a current state of a peripheral device of the user system, b) a current state of software present in the user system, c) a current user preference, or d) current controls set in said user system.

16. The system of claim 11, where said production of presentation content based on the result of executing said behavior comprises removing at least a portion of said authored content.

17. The system of claim 11, where said production of presentation content based on the result of executing said behavior comprises setting at least a portion of said authored content to not be displayed.

18. The system of claim 17, where said setting some portion of said authored content to not be displayed comprises allowing the user to see said portion of said authored content only on request.

19. A computer configured to produce runtime content, the computer comprising:

a processor that executes computer executable instructions stored in a computer readable storage medium of the computer, the computer executable instructions comprising:

an authoring tool configured to generate a pre-transformed authored content;

a link adder configured to add to said authored content, at least one of a) an embedded link for adding additional content data to the authored content and b) an embedded behavior link tag for executing a behavior for influencing said authored content; and a packager configured to transform said authored content to a presentational content for displaying on a display of the computer, the transforming comprising querying a current state of the computer, and performing a security check to determine if said behavior can be trusted to execute correctly, failing which, the presentational content is defaulted to a default content, wherein:

said querying comprises querying the current state of a desktop of the computer system;

executing said behavior results in providing a help operation that is specifically tailored to the current state of the desktop; and the help operation comprises using the current state of the desktop to point to a portion of the desktop as a guide.

* * * * *